US009799910B2

(12) United States Patent
Sawada

(10) Patent No.: US 9,799,910 B2
(45) Date of Patent: Oct. 24, 2017

(54) WELDING APPARATUS AND A WELDING METHOD FOR SEPARATOR OF ELECTRICAL DEVICE

(71) Applicant: NISSAN MOTOR CO., LTD., Yokohama-shi, Kanagawa (JP)

(72) Inventor: Yasuhiro Sawada, Isehara (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 209 days.

(21) Appl. No.: 14/654,942

(22) PCT Filed: Nov. 26, 2013

(86) PCT No.: PCT/JP2013/081792
§ 371 (c)(1),
(2) Date: Jun. 23, 2015

(87) PCT Pub. No.: WO2014/103594
PCT Pub. Date: Jul. 3, 2014

(65) Prior Publication Data
US 2016/0197372 A1    Jul. 7, 2016

(30) Foreign Application Priority Data

Dec. 28, 2012  (JP) ................. 2012-286988
Dec. 28, 2012  (JP) ................. 2012-286993

(51) Int. Cl.
*H01M 10/04*    (2006.01)
*B23K 31/02*    (2006.01)
(Continued)

(52) U.S. Cl.
CPC ......... *H01M 10/0413* (2013.01); *B23K 31/02* (2013.01); *H01M 2/1673* (2013.01);
(Continued)

(58) Field of Classification Search
CPC .................................. H01M 2/1686
See application file for complete search history.

(56) References Cited

U.S. PATENT DOCUMENTS

| 4,351,106 A | 9/1982 | Brady |
| 2004/0048152 A1* | 3/2004 | Yata .................. H01M 2/0207 429/162 |

(Continued)

FOREIGN PATENT DOCUMENTS

| CN | 102610775 A | 7/2012 |
| JP | 04174962 A | 6/1992 |

(Continued)

OTHER PUBLICATIONS

S.S. Zhang, "A review on the separators of liquid electrolyte Li-ion batteries", Journal of Power Sources, vol. 164, Nov. 22, 2006, pp. 351-364.

(Continued)

*Primary Examiner* — Matthew Merkling
(74) *Attorney, Agent, or Firm* — Young Basile Hanlon & MacFarlane, P.C.

(57) ABSTRACT

An electric device is capable of preventing a heat-resistant material of a separator from scattering even when the electric device vibrates or receives shocks. The electric device has a power generating element formed by alternately laminating a first electrode, a second electrode of a polarity different from the first electrode with a separator interposed therebetween. The separator includes a hot-melt material and the heat-resistant material which is laminated only on one surface of the melt material and having a higher melting point than the melt material. The adjacent separators are welded or joined each other with the heat-resistant material thereof facing each other.

3 Claims, 8 Drawing Sheets

(51) Int. Cl.
  *H01M 2/16* (2006.01)
  *H01M 10/0585* (2010.01)
  *H01M 10/052* (2010.01)
  *H01M 10/058* (2010.01)

(52) U.S. Cl.
  CPC ......... *H01M 2/1686* (2013.01); *H01M 10/04* (2013.01); *H01M 10/0404* (2013.01); *H01M 10/0436* (2013.01); *H01M 10/0468* (2013.01); *H01M 10/0585* (2013.01); *H01M 10/052* (2013.01); *H01M 10/058* (2013.01)

(56) References Cited

U.S. PATENT DOCUMENTS

| | | |
|---|---|---|
| 2011/0244304 A1 | 10/2011 | Shinyashiki et al. |
| 2014/0026400 A1 | 1/2014 | Yuhara et al. |

FOREIGN PATENT DOCUMENTS

| | | |
|---|---|---|
| JP | 3089660 B2 | 9/2000 |
| JP | 2008059966 A | 3/2008 |
| JP | 2009009919 A | 1/2009 |
| JP | 2011003381 A | 1/2011 |
| JP | 2011210524 A | 10/2011 |
| JP | 4823393 B1 | 11/2011 |
| JP | 2012227125 A | 11/2012 |
| JP | 2013143336 A | 7/2013 |
| JP | 2013143337 A | 7/2013 |
| WO | 2012-020480 A1 | 2/2012 |
| WO | 2012060231 A1 | 5/2012 |
| WO | 2012-137904 A1 | 10/2012 |
| WO | 2014087884 A1 | 6/2014 |
| WO | 2014087885 A1 | 6/2014 |

OTHER PUBLICATIONS

Jeong et al., "Closely packed SiO2 nanoparticles/poly(vinylidene fluoride-hexafluoropropylene) layers-coated polyethylene separators for lithium-ion batteries", Journal of Power Sources, vol. 196, Nov. 12, 2010, pp. 6716-6722.

* cited by examiner

WELDING APPARATUS AND A WELDING METHOD FOR SEPARATOR OF ELECTRICAL DEVICE

CROSS REFERENCE TO RELATED APPLICATIONS

The present application claims priority to Japanese Patent Application Nos. 2012-286988, filed Dec. 28, 2012, and 2012-286993, filed Dec. 28, 2012, each incorporated herein in its entirety.

TECHNICAL FIELD

The present invention relates to an electrical device, a welding apparatus for a separator of the electrical device and to a cutting method thereof.

BACKGROUND

Conventionally, in an electrical device such as a secondary battery, a power generating element for performing charging and discharging operations is sealed in an outer or exterior package. The power generating element is formed by stacking or laminating a separator and electrodes. The separator easily shrinks when heated. When the separator shrinks, electrical short circuit occurs locally. This would reduce the output of the electrical device.

Thus, by using, as a counter measure, a separator which is formed by laminating on a heat-resistant layer of heat-resistant material a hot-melt layer having a melting point lower than the melting point of the heat-resistant layer, the separator is prevented from shrinkage or contracting even if the separator is heated. The hot-melt layers of the laminated battery are fixed together by thermal welding (see Japanese Patent Application Publication No. 2011-210524A, for example).

Incidentally, a technique is disclosed as a laminating device of an electrode and a separator, which first and second separators are drawn out in response to a rotation of a suction drum, and the electrode is bagged or pouched by the separators while the suction drum rotates once (see Japanese Patent Application Publication No. 2011-003381A). Further, another technique is disclosed in which a periphery of an electrode plate is enclosed by welding of a continuous separator so as to prevent the position of the electrode plate from being deviated (for example, see Japanese Patent Application Publication No. 2009-009919A).

However, as shown in FIGS. 14 and 15 in Japanese Patent Application Publication No. 2011-210524A, the heat-resistant layers on the outermost surface at both ends of a laminated body are respectively exposed. Also, on both end portions of each separator, the heat-resistant layer is exposed.

In such a state, there is a possibility that when the stacked battery receives a shock or undergoes vibration, the heat-resistant material of the separator may be scattered, which would reduce the electrical characteristics. In the separator shown in FIG. 3 of Japanese Patent Application Publication No. 2011-210524A, since a hot-melt layer is disposed on both surfaces of the heat-resistant layer, the heat-resistant material is not scattered. However, the layer thickness of the separator becomes thicker.

Further, in any of Japanese Patent Application Publication No. 2011-003381A and Japanese Patent Application Publication No. 2009-009919A, when transporting or conveying the separator formed by laminating the heat-resistant material and the hot-melt material, no specific consideration is given so as block the otherwise easy to be scattered heat-resistant material from being scattered easily.

In this configuration, when using a separator which is formed by laminating the heat-resistant material and the melt material there is a possibility that the heat-resistant material of the separator may be scattered in the separator welding apparatus.

SUMMARY

The present invention has been made in order to solve the above problem, and aims to provide an electrical device which can prevent scattering of the heat-resistant material of the separator when receiving shocks or vibrations.

Further, the present invention has been proposed in order to solve the above problem, and aims to provide a welding or bonding apparatus of a separator of an electrical device and a welding method thereof, in which the heat-resistant material of the separator is prevented from being scattered.

In order to achieve the object described above, an electrical device pertaining to the present invention includes an electricity or power generating element. The poorer generating element is formed by laminating a first electrode and a second electrode of polarity different from the first electrode with a separator interposed therebetween. The separator includes a melt material and a heat-resistant material laminated on only one surface of the melt material and having a melting point higher than the melt material. The adjacent separators are welded with the heat-resistant material layers facing each other. Out of the first electrode and the second electrode, the electrode with a relatively higher frictional force with the heat-resistant material is sandwiched by the adjacent separators for joining or welding.

A welding apparatus for a separator of an electrical device pertaining to the present invention which achieves the object described above relates to a welding apparatus of separators of the electrical device formed by alternately laminating a first electrode, a second electrode of polarity different from the first electrode with a separator interposed. Such a separator is used in which a melt material and a heat-resistant material laminated on only one surface of the melt material and having a melting point higher than the melt material. Here, the separator is conveyed with the side of the melt material being held by a conveying apparatus, and the adjacent separators are joined together with the respective heat-resistant material thereof facing each other.

Further, a welding method for a separator of an electrical device pertaining to the present invention which achieves the object described above relates to a welding method of separators of the electrical device formed by alternately laminating a first electrode, a second electrode of polarity different from the first electrode with a separator interposed, and joining or welding adjacent separators together. Such a separator is used in which a melt material and a heat-resistant material laminated on only one surface of the melt material and having a melting point higher than the melt material. Here, the separator is conveyed with the side of the melt material being held by a conveying apparatus, and the adjacent separators are joined together with the respective heat-resistant material thereof facing each other.

DETAILED DESCRIPTION OF THE EMBODIMENTS

Figure 1:
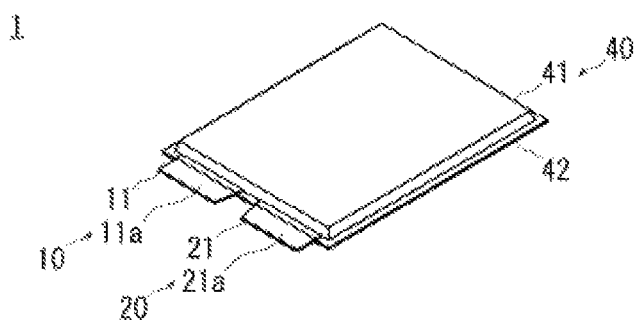
FIG. 1 is a perspective view showing an electrical device pertaining to a first embodiment.

Below, with reference to accompanying drawings, description is given of an embodiment of the present invention. The sale reference numerals are given to the same elements, and duplicate description will be omitted in the description of the drawings. The proportion and size of each member in the drawings may be different from the proportion and the size of the actual one, and exaggerated for convenience of explanation.

First Embodiment

First, description is given of a structure of an electrical device 1 in which separators 30 are welded or joined by a separator welding apparatus 100 pertaining to the first embodiment, with reference to FIGS. 1 to 4.

Figure 2:
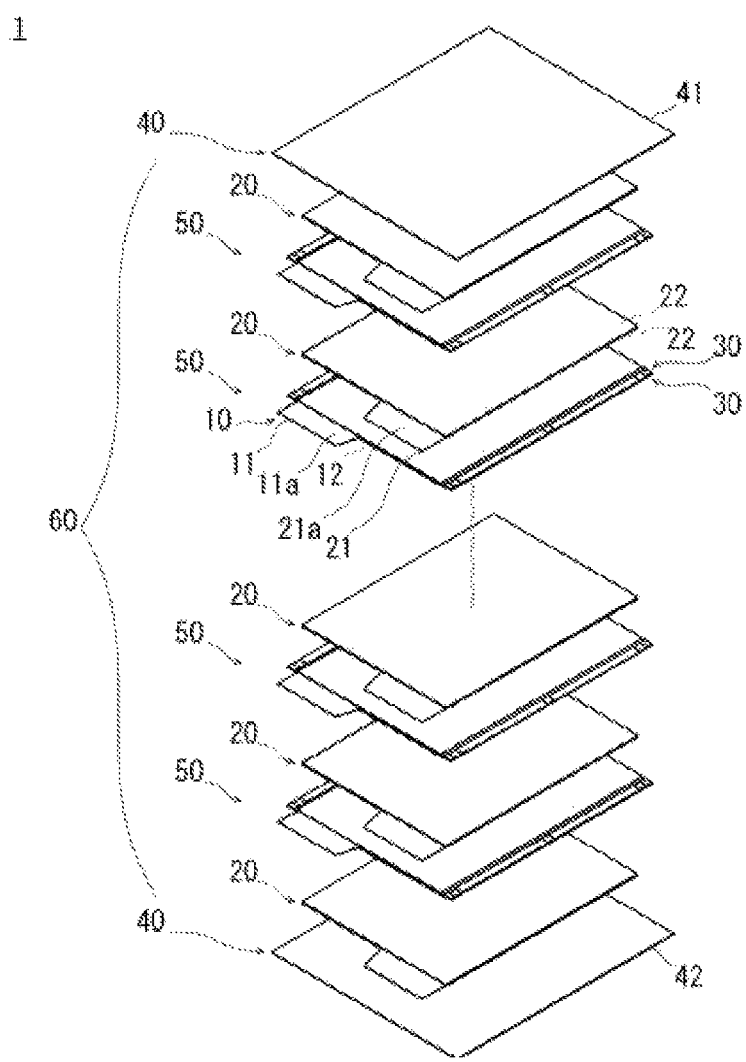
FIG. 2 is an exploded perspective view showing an electrical device pertaining to the first embodiment.
Figure 3:
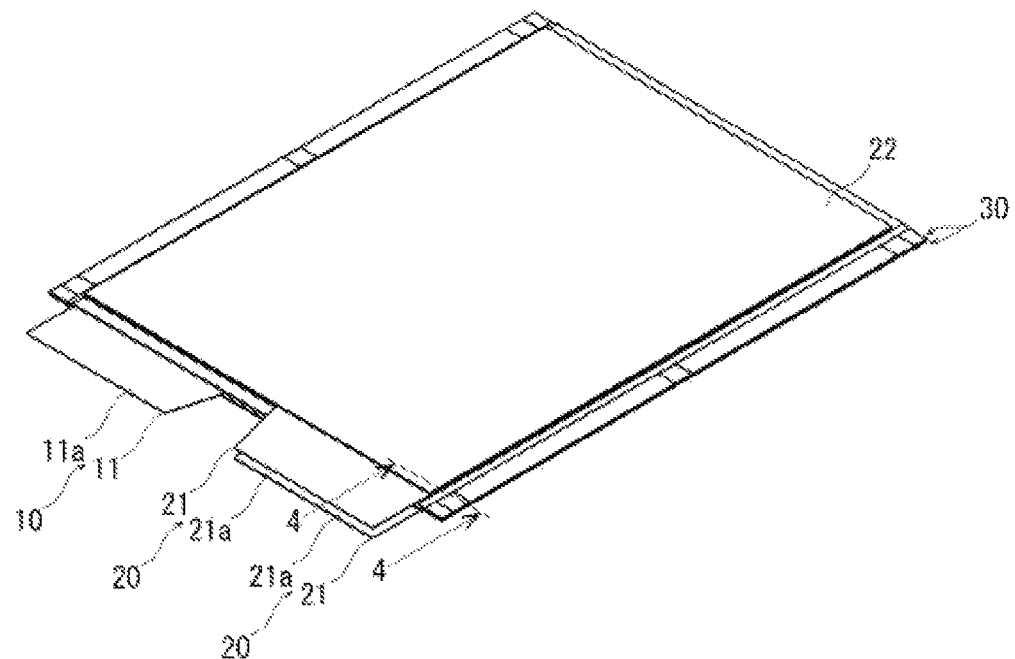
FIG. 3 is a perspective view showing a state in which, a positive electrode is enclosed in a bag or pouch by a pair of separators to form a pouched electrode, and, on both surfaces thereof, being laminated respectively with a negative electrode.
Figure 4:
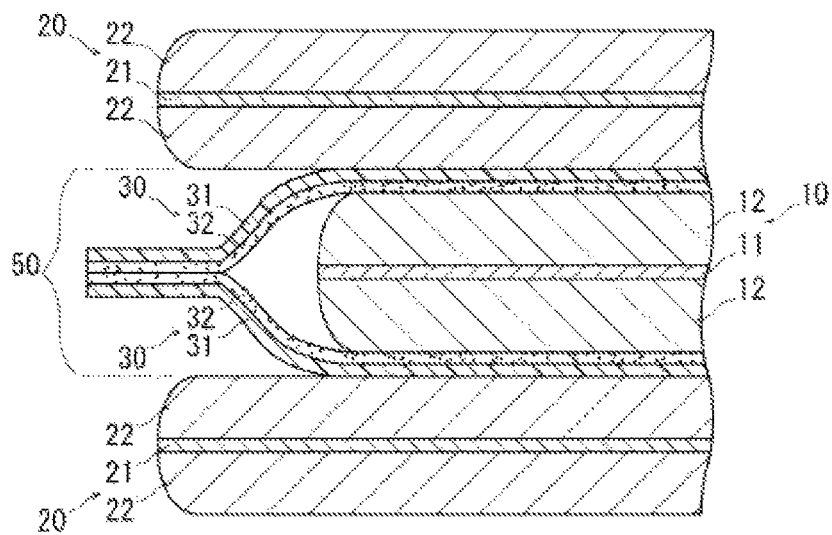
FIG. 4 is a sectional view pertaining to the first embodiment taken along line 4-4 of FIG. 3.

FIG. 1 is a perspective view showing an electrical device 1 in which separators 30 are joined by the separator welding apparatus 100; FIG. 2 is an exploded perspective view showing an electrical device 1 in which separators are joined by the separator welding apparatus 100; and FIG. 3 is a perspective view showing a state in which, by the welding apparatus 100, a positive electrode 10 is enclosed in a bag or a pouch by a pair of separators 30 to form a pouched electrode 50 with, on both ends thereof, being laminated with a negative electrode 20, respectively; and FIG. 4 is a sectional view taken along line 4-4 shown in FIG. 3.

As shown in FIG. 1, for example, the electrical device 1 represents a lithium ion secondary battery, a lithium polymer battery, a nickel hydrogen battery, a nickel cadmium battery.

A shown in FIG. 2, in the electrical device 1, the power generating element 60 for charge/discharge is sealed with an outer or exterior material 40. The power generating element 60 is configured by alternately laminating a pouched electrode 50 sandwiching a positive electrode 10 by a pair of separators 30 for welding and a negative electrode 20.

The positive electrode 10 represents a first electrode, and is formed by bonding on both surfaces of a conductive, positive electrode collector 11 a positive active material 12, as shown in FIG. 2. A positive electrode terminal 11a for taking out the power is formed by extending a part of one end of the positive electrode collector 11. A plurality of positive electrode terminals 11a of the plurality of laminated positive electrodes 10 are fixed together by welding or adhesive.

The material of the positive electrode current collector 11 of the positive electrode 10, for example, is made of aluminum expanded metal, or aluminum mesh or aluminum punched metal. When the electrical device 1 is a lithium ion secondary battery, the material of the positive electrode active material 12 of the positive electrode 10 is composes of various oxides (lithium manganese oxide, such as $LiMn_2O_4$; manganese dioxide; lithium nickel oxides such as $LiNiO_2$; lithium cobalt oxide such as $LiCoO_2$; lithium-containing nickel-cobalt oxide; amorphous pentoxide vanadium containing lithium) or chalcogen compound (titanium disulfide, molybdenum disulfide).

A negative electrode 20 corresponds to a second electrode of different polarity to the first electrode (positive electrode 10), and as shown in FIG. 2, is formed by bonding negative active material 22 on both surfaces of a negative electrode current collector 21 which is conductive. A negative electrode terminal 21a is formed by extending from a part of one end of the negative electrode collector 21 so as not overlap the positive electrode terminal 11a formed in the positive electrode 10. The longitudinal length of the negative electrode 20 is longer than the longitudinal length of the positive electrode 10. In the lateral length of the negative electrode 20 is of the same as that of the positive electrode 10. A plurality of negative electrode terminals 21a of the negative electrodes 20 stacked is secured together by adhesive or welding.

The material of the negative electrode current collector 21 of the negative electrode 20, for example, is made from a copper expanded metal, copper mesh, or copper punched metal. As the material of the negative electrode active material 22 of the negative electrode 20, when the electrical device 1 is a lithium ion secondary battery, and use is made of a carbon material that adsorbs and releases lithium ion. As such carbon material, for example, natural graphite, artificial graphite, carbon black, activated carbon, carbon fiber, coke, or organic precursor (phenolic resin, polyacrylonitrile, or cellulose) is heat-treated in an inert atmosphere and synthetic carbon is used.

As shown in FIG. 2, the separator 30 is provided between the positive and negative electrodes 10, 20 to electrically isolate the positive electrode 10 and the negative electrode 20 from each other. By holding an electrolyte solution between the positive electrode 10 and the negative electrode 20, the separator 30 ensures conductivity of the ion. The separator 30 is formed in a rectangular shape. The longitudinal length of the separator 30 is longer than the longitudinal length of the negative electrode 20 except the portion of the negative electrode terminal 21a.

The separator 30, as shown in FIG. 4, is formed by laminating a hot-melt material 31 and a heat-resistant material 32. The heat-resistant material 32 has a higher melting temperature than that of the melt material 31. A pair of adjacent separators 30 is bonded with the associated melt material 32 faced to each other. Thus, for example, even when the heat-resistant material 32 is powder which may easily scatter after being applied to the melt material 31 and subsequently dried, the powder may be confined and sealed in the interior of the pair of the adjacent separators 30. That is, even if the electrical device 1 receives shocks or vibrations, it is possible to prevent scattering of the heat-resistant material 32 of the separator 30.

Here, the heat-resistant material 32 of the separator 30 and the positive electrode active material 12 of the positive electrode 10 are in contact with each other. Between the heat-resistant material 32 and the positive electrode active material 12, friction force is generated. Therefore, even if the electrical device 1 vibrates or receives shocks, the vibration of the positive electrode 10 may be suppressed with the positive electrode 10 bagged with the separator 30 in a pouched electrode 50. More specifically, be suppressing a positional deviation of the positive electrode 10 within the electrical device 1, damage of the electrical device 1 may be prevented, and an electrical property is maintained.

As the material of the melt material 31 of the separator 30, for example, use is made of a polypropylene. The molten material 31 is impregnated with a non-aqueous electrolyte solution prepared by dissolving an electrolyte in anon-aqueous solvent. In order to retain the non-aqueous electrolytic solution, use is made to contain a polymer. As a material of the heat-resistant material 32 of the separator 30, for example, use is made of a ceramic molded with high temperature inorganic compounds. The ceramic is formed to be porous by binding ceramic particles of silica, alumina, zirconium oxide, titanium oxide with a binder. The material of the heat-resistant material 32 is not limited to ceramic. The alternative is acceptable as long as the melting temperature thereof may be higher than the melting member 31.

As shown in FIG. 2, the outer or exterior package 40 may be consisted, for example, of laminate sheets 41, 42 with a metal plate inside and is sealed by covering both sides of the power generating element 60. When sealing the power generating element 60 with the laminate sheets 41, 42, a portion of the periphery of the laminate sheet 41 and 42 is made open, and the other periphery will be sealed by heat welding or the like. An electrolyte is injected from the portion that is open and the separator 30 or the like is impregnated with a liquid charge. While depressurizing the interior from the open portion of the laminate sheets 41, 42 to remove air, the open portion will also be heat-sealed to seal completely.

As the material for the laminate sheets 41, 42, for example, use is made of three different, laminated materials. Specifically, for the material of the heat-fusible resin of the first layer adjacent to the negative electrode 20, use is made from, for example, polyethylene (PE), ionomer, or ethylene vinyl acetate (EVA). As the metal foil of the second layer, for example, use is made of an Al foil or Ni foil. As the resin film of the third layer, for example, use is made of polyethylene terephthalate (PET) or nylon with rigidity.

According to an electrical device 1 in which separators 30 are welded together by a separator welding apparatus 100 pertaining to the present embodiment described above, the following effects may be obtained.

The electrical device 1 includes a power generating element 60. The power generating element 60 is formed by laminating a first electrode (positive electrode 10) and a second electrode (negative electrode 20) of polarity different from the first electrode (positive electrode 10) with a separator 30 interposed therebetween. The separator 30 includes a melt material 31 and a heat-resistant material 32 laminated on only one surface of the melt material 31 and having a melting point higher than the melt material 31. The adjacent separators 30 are joined together with the respective heat-resistant material 32 thereof facing each other.

According to the electrical device 1 thus configured, the heat-resistant material 32 may be sealed by confining the heat-resistant material 32 within the interior of the adjacent separators 30. Thus, even when the electrical device 1 vibrates or receives shocks, it is possible to prevent the heat-resistant material 32 of the separator 30 from being scattered. Therefore, the electric property of the electrical device may be maintained.

Further, according to the electrical device 1, it may be configured such that, out of the first electrode (positive electrode 10) and the second electrode (negative electrode 20), the electrode with a relatively higher frictional force with the heat-resistant material 32 may be selected to be sandwiched by the adjacent separators 30 for welding or joining.

According to the electrical device thus configured, for example, the heat-resistant material 32 and the positive electrode active material 12 of the positive electrode 10 are in contact to each other to generate a friction force therebetween. Thus, even when the electrical device vibrates or receives shocks, it is possible to prevent the positive electrode 10 from being displaced within a pouched electrode 50 in which the positive electrode 10 is bagged or pouched by separators 30. In other words, in the electrical device 1, by suppressing stack deviation of the positive electrode 10, the electrical device 1 may be protected from damage and the electric property thereof may be maintained.

Further, according to the electrical device 1, the heat-resistant material 32 may be configured to include a powder applied to the melt material 31 and subsequently dried.

According to the electric device 1 configured as described above, in particular, when the heat-resistant material 32 is composed of easily to be scattered powder, the powder may be sealed by confining the powder within the interior of the separator 30. That is, even when the electrical device vibrates and receives shocks, within the electrical device 1, the heat-resistant material composed of powder may be effectively blocked from scattering by the melt material 31 of the separator 30. In addition, according to the electrical device 1, the powder may be formed of ceramics.

According to the electric device 1 configured as described above, in particular, even when the heat-resistant material 32 is made of porous material which can be easily scattered as ceramics molded from inorganic compounds at a high temperature, the ceramics may be sealed to confine within the interior of the adjacent separators 30. That is, even when the electrical device vibrates and receives shocks, within the electrical device 1, the heat-resistant material composed of porous ceramics formed by binding particles and binder may be effectively blocked from scattering by the melt material 31 of the separator 30.

Now, description is give of a welding method for joining separators 30 together of an electrical device 1, and of a separator welding apparatus 100 implementing the welding method, with reference to FIGS. 5 to 10.

Figure 5:
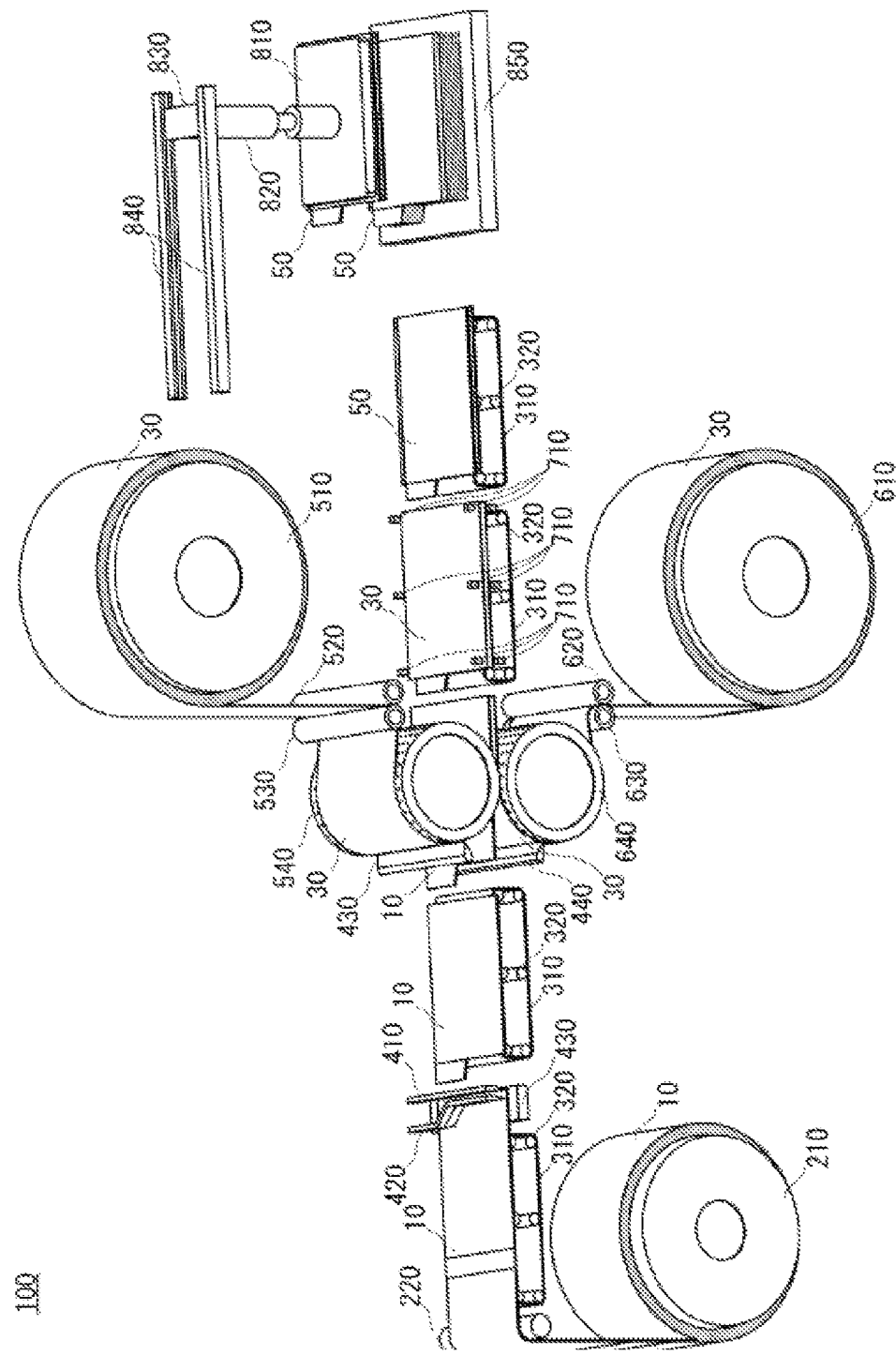
FIG. 5 is a perspective view showing a separator welding apparatus for joining the separators of the electrical device pertaining to the first embodiment.
Figure 6:
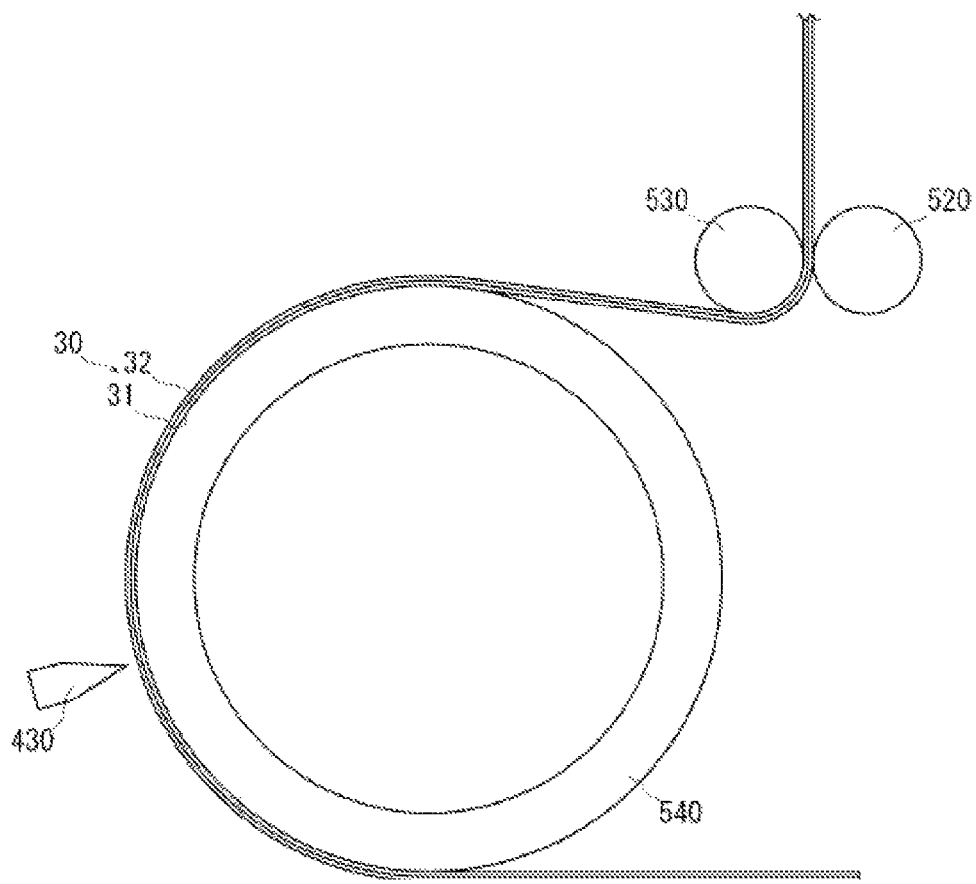
FIG. 6 is a side view showing the vicinity of a vacuum suction conveyance drum of a separator welding apparatus that joins the separators of an electrical device pertaining to the first embodiment.
Figure 7:
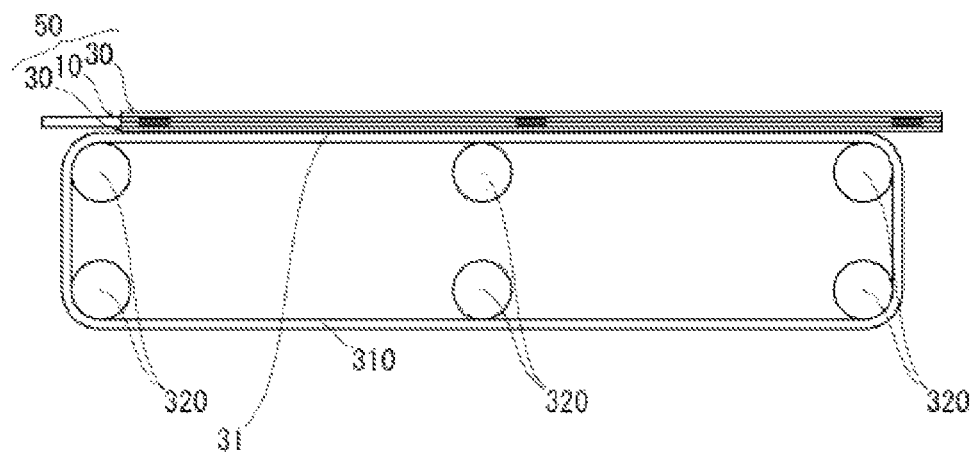
FIG. 7 is a side view showing the vicinity of a suction conveyor of the separator welding apparatus of separators of an electrical device pertaining to the first embodiment.
Figure 8:
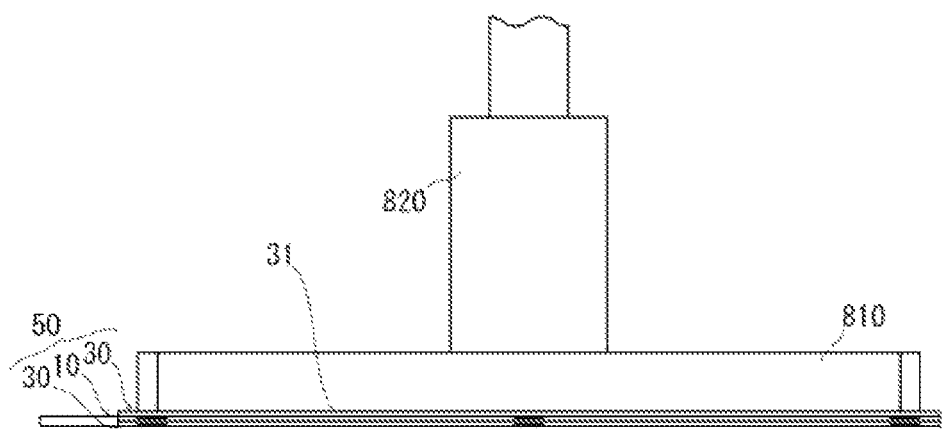
FIG. 8 is a side view showing the vicinity of a pouched electrode suction pad of a separator welding apparatus which joins separators of an electrical device pertaining to the first embodiment.
Figure 9:
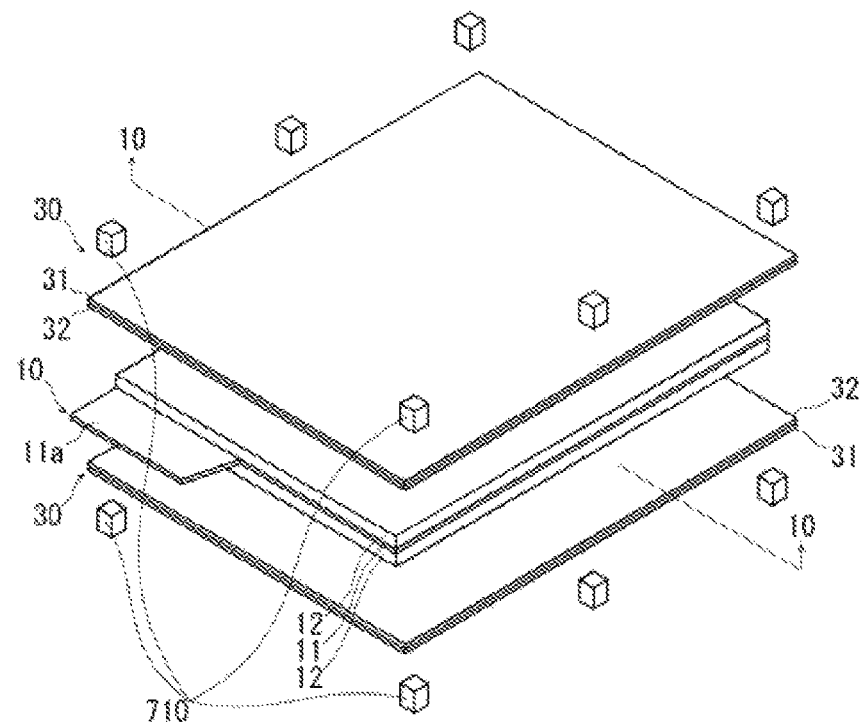
FIG. 9 is a perspective view showing the vicinity of a heating press member of the separator welding apparatus which joins separators of an electrical device pertaining to the first embodiment.
Figure 10A:
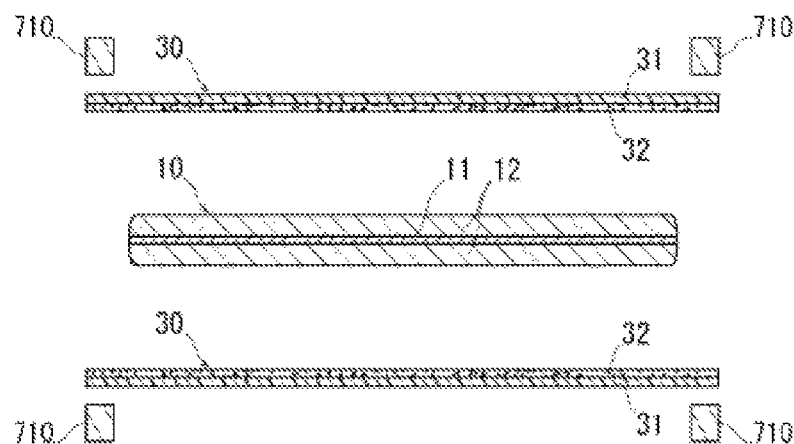
FIGS. 10A-10C are section views along line 10-10 in FIG. 9 pertaining to the first embodiment.
Figure 10B:
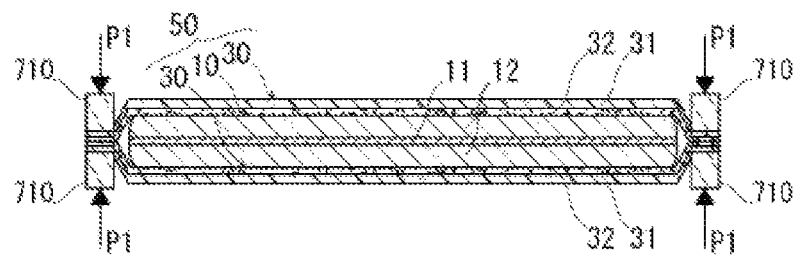
Figure 10C:
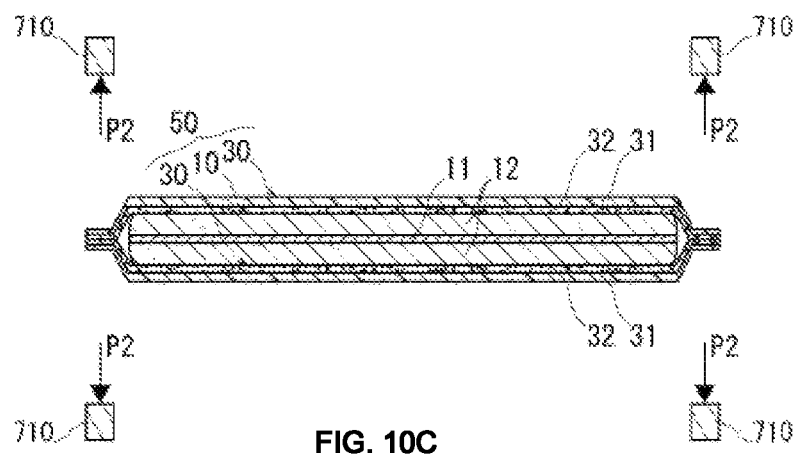

FIG. 5 is a perspective view showing a separator welding apparatus 100 for joining the separators 30 of an electrical device; FIG. 6 is a side view showing the vicinity of a vacuum suction conveyance drum 540 of a separator welding apparatus 100 that joins the separators 30 of an electrical device 1; FIG. 7 is a side view showing the vicinity of the suction conveyor 310 of the separator welding apparatus 100 for separators 30 of an electrical device 1; FIG. 8 is a side view showing the vicinity of a pouched electrode suction pad 810 of a separator welding apparatus 100 which joins separators 30 of an electrical device 1; FIG. 9 is a perspective view showing the vicinity of a heating press member 710 of the separator welding apparatus 100 which joins separators 30 of an electrical device 1; and FIGS. 10A-10C are section views along line 10-10 in FIG. 9.

Here, it is equally acceptable to join separators 30 together while conveying by pressurizing the separators 30 together by a heating press member 710 while heating, and to insert thereafter a positive electrode between a pair of the separators 30. However, in view of productivity and quality, description is given with respect to such a configuration in which the positive electrode sandwiched by the separators 30 are joined together by heating press member 710 under heat and pressure while being conveyed.

As shown in FIG. 5, in the separator welding apparatus 100, the positive electrode 10 is held by being wound into a roll around a positive electrode winding roller 210. The positive electrode winding roller 210 is formed in a cylindrical shape and rotates in a clockwise direction following the rotation of the suction conveyor 310. The positive electrode 10 is carried out from the positive electrode winding roller 210 conveyed in the direction of 640 toward a vacuum suction conveyance drum 540 described below through a conveyance roller 220.

The suction conveyer 310 representative of a conveying apparatus consists of an endless belt and provided with a plurality of suction holes on the surface. On the inner circumferential surface of the suction conveyor 310, a plurality of rotating rollers 320 is arranged. One of a plurality of the rotating rollers 20 is intended for a driving roller, and the others are driven rollers. The suction conveyors 310 caused to be rotated in a clockwise direction by the plurality of rotating rollers 320 are provided in two sets respectively on the conveyance downstream side and the conveyance upstream side of the positive electrode with respect to the vacuum suction conveyance drums 540, 640.

The cutting members 410, 420 for cutting out the positive electrode 10 are disposed between two sets of suction conveyors 310 disposed upstream in the conveyance direction of the positive electrode 10 with respect to the vacuum suction conveyance drum 540, 640. The cutting member 410 is provided at the tip with a sharp and straight cutting blade and cuts one end of the positive electrode 10 that is continuous. The cutting member 420 is provided with a sharp and bent cutting blade at the tip, and cuts the other end of the positive electrode 10 immediately after being cut at that one end. The shape of the bent cutting blade of the cutting member 420 corresponds to the shape of the positive electrode terminal 11a.

One separator 30 of the pair of separators 30 is held in a roll and wound around the separator winding roller 510. A melt or fused material 31 of the one separator 30 is in contact with a side of axis of the separator winding roller 510. The separator winding roller 510 is formed in a cylindrical shape and allowed to rotate in counterclockwise direction following the rotation of the vacuum suction conveyance drum 540 representing the conveying apparatus. The one separator 30 is conveyed with a constant tension posed and sandwiched between the pressure roller 520 and the nip roller 530, and is further caused to rotate in a counterclockwise in a state of being vacuum sucked around the vacuum suction conveyance drum 540. The vacuum suction conveyance drum 540 is formed in a cylindrical shape with a plurality of suction ports. The one separator 30 is cut out with a constant interval by a cutting member 430 disposed adjacent the vacuum suction conveyance drum 540 and having a sharp cutting blade at its tip.

Similarly, the other separator 30 of the pair separators 30 is held by winding into a roll around the separator winding roller 610. A melt material 31 of the other separator 30 is in contact with a side of axis of the separator winding roller 610. The separator winding roller 610 is formed in a cylindrical shape and allowed to rotate in clockwise direction following the rotation of the vacuum suction conveyance drum 640 representing the conveying apparatus. The other separator 30 is conveyed with a constant tension imposed and sandwiched between the pressure roller 620 and the nip roller 630, and is further caused to rotate in a clockwise in a state of being vacuum sucked around the vacuum suction conveyance drum 640. The vacuum suction conveyer drum 640 is formed in a cylindrical shape with a plurality of suction ports. The other separator 30 is cut out with a constant interval by a cutting member 440 disposed adjacent the vacuum suction conveyance drum 640 and having a sharp cutting blade at its tip.

The one separator 30, the positive electrode 10, and the other separator 30 are conveyed in a laminated state such that the pair of the separators 30 sandwich the positive electrode 10 in a gap created between the vacuum suction conveyance drums 540, 640.

As shown in FIG. 9, the heating press member 710 is respectively disposed above and below both ends of the pair of separators 30 in the longitudinal direction thereof and is configured to sandwich the pair of the separators 30 and subsequently move up or down to separate from each other. Note that, in FIG. 9, actually, the one separator 30, the positive electrode 10, and the other separator 30 are in a stacked state. However, they are shown separately from each other. The pair of separators 30 sandwiching the positive electrode 10 are joined or welded to form a pouched electrode 50. The pair of the separators 30 is disposed such that the respective heat-resistant member 32 comes to face each other. The heating press member 710 is made of stainless steel or copper, for example, and formed in a cuboid shape. The heating press member 710 is driven to move up and down by a drive unit not shown. The heating press member 910 will be heated by a heat wire or a heating bulb.

As shown in FIG. 10A, a plurality of the heating press members 710 is disposed so as to sandwich both ends of the pair of the separators 30 in the longitudinal direction thereof from the vertical direction. The configuration shown by section in FIG. 10A corresponds that shown in perspective view in FIG. 9. Note that, in FIG. 10A, actually, the one separator 30, the positive electrode 10, and the other separator 30 are in a stacked state. However, they are shown separately from each other.

As shown in FIG. 10B, by driving a plurality of heating press members 710 in the direction shown by P1 in the figure from both directions in the vertical direction so as to clamp or sandwich both ends in the longitudinal direction of the separators 30, the pair of separators 30 may be welded. At this time, the pair of the separators 30 are heated and pressurized by the heating press member 710 to be joined.

As shown in FIG. 10C, by driving a plurality of heating press members 710 in the direction shown by P2 in the figure from both directions in the vertical direction so as to be separated from the joined pair of the separators 30. In the separator welding method described above with reference to FIGS. 11 and 10, the heating press member 710 pressurized the pair of separators 30 clamping the positive electrode 10 while heating to join the paired separators 30. The welding process of such a pair of the separators 30 corresponds to a process of a so-called pouched electrode forming step, which is efficient in terms of productivity and cost.

A bagged or pouched electrode suction pad 1010 corresponding to a conveying apparatus places a completed pouched electrode 50 temporarily on a mounting table 1050. The pouched electrode suction pad 1010 is plate-shaped and provided with a plurality of suction ports in the surface which is in contact with the pouched electrode 50. The pouched electrode suction pad 1010 is coupled to an end of a telescopic part 1020, which is telescopically extendable by power of the air compressor or the like, for example (not shown). The other end of the telescopic part 1020 is coupled to a plate-shaped support member 1030. The support member 1030 reciprocates along a pair of rails by a rotation motor (not shown), for example. As described, the pouched electrode suction pad 1010 moves the pouched electrode 50 while sucking the same by the telescopic part 1020, support member 1030, and the pair of rails 1040, which has been conveyed by the suction conveyor 310 to place on the mounting table 850.

The vacuum suction conveyance drum 540, the suction conveyor 310, and the pouched electrode suction pad 810, shown in FIGS. 6 to 8, respectively, collectively correspond to a conveying apparatus which conveys or transports the separator 30 in a sucked state. Here, as the material of the melt material 31 of the separator 30, for example, use is made of a polypropylene, which is not scattered. On the other hand, as a material of the heat-resistant material 32 of the separator 30, for example, use is made of a ceramic molded with high temperature inorganic compounds, which is easily scattered in powder. Thus, the vacuum suction conveyance drum 540, the suction conveyor 310, and the pouched electrode suction pad 810 is configured to suck the side of the melt material 31 of the separator 30, which is easily scattered, instead of the heat-resistant material 32 of the separator 30. According to the electrical device 1 thus configured, since the side of the melt material 31 on the separator 30, which is difficult to be scattered, is sucked for transportation, it is possible to prevent the heat-resistant material 32 of the separator 30 from being scattered within the separator welding apparatus 100.

Further, each of the conveying apparatuses, the vacuum suction conveyance drum 540, the suction conveyer 310, and the pouched electrode suction pad 810 transports the separate 30 while sucking the side of the melt material 31 on which the separator 30 will not be scattered. Thus the suction force thereof may be maintained constant. Due to the constant suction force of the separator at each conveying apparatus, the feed rate or size of the separator is held constant. Further, since each conveying apparatus does not suck the side of the heat-resistant material on which scattering is expected, the heat-resistant material 32 is unlikely to flow into pieces. Thus, is not necessary to provide a cleaning mechanism to remove the scatter flied powder and the like in the periphery of each conveying apparatus. Therefore, the structure of the separator welding apparatus 100 may be made compact and cost thereof may be reduced. In addition, each conveying apparatus is configured not to suck the side of the heat-resistant material, which is easily scattered or peeled off, it is possible to prevent the heat-resistant material 32 from exfoliating from the melt material 31, or occurring suction marks, or generating touch marks. Furthermore, each conveying apparatus is configured not to suck the side of the heat-resistant material 32, which easily scatter flies so as to be prevented from being clogged with powder. Therefore, it is not necessary to install, clean or replace in a regular interval a filter or the like in each conveying apparatus for removal to the powder.

According to the welding method of separators together of an electrical device 1 described above, and a separator welding apparatus 100 carrying out the welding method, the following effects may be obtained.

A welding method of a separator of an electrical device 1, and a separator welding apparatus 100 that implements the welding method is intended, in a laminated body formed by alternately laminating a first electrode (positive electrode 10), a second electrode (negative electrode 20) of polarity different from the first electrode (positive electrode 10) with a separator interposed therebetween, to join adjacent separators 30. Use is thereby made of a separator 30 including a hot-melt material 31, and a heat resistant material 32 laminated on only one surface of the melt material 31 and having a higher melting point than the melt material. Here, the separator 30 is conveyed with the side of the melt material 31 of the separator 30 being held, and the adjacent separators 30 are joined with the respective heat-resistant material 32 facing each other.

According to the thus configured welding method of separators of an electrical device 1, a separator welding apparatus 100, since the side of the melt material 31, on which the separator 30 is less likely scattered is held for transportation, in the separator welding apparatus 100, it is possible to prevent the heat-resistant material 32 of the separator 30 from being scattered. Therefore, it is possible to keep clean inside the separator welding apparatus 100, and to maintain the electric property of the electrical device 1 whose separators are joined.

In addition, each of the conveying apparatuses, i.e., the vacuum suction conveying drum 540, the suction conveyor 310, and the pouched electrode suction pad 810, sucks the side of melt material 31, on which the separator 30 is unlikely to scatter flies while conveying. Thus, the suction force may be maintained constant. When the suction force of the separator 30 is held constant by each conveying apparatus, the feeding rate or size of the separator 30 may be held constant.

Further, each conveying device does not suck the side of heat-resistant material 32 which is easily scattered. Thus, it is not necessary to provide mechanism for removing and cleaning the scattered powder and the like scattered in the periphery of the conveying apparatus. Therefore, it is possible to miniaturize the arrangement of a separator welding apparatus 100 while reducing the associated cost.

Furthermore, since each conveying apparatus does not suck the side of heat-resistant material 32 which is easily peeled off and scattered, the heat-resistant material 32 will be prevented from exfoliated from the melt material 31. Also, the suction marks may be prevented from occurring. In addition, contact or scratch marks may be prevented from being caused.

Furthermore, since each conveying apparatus does not suck the easily to be scattered heat-resistant material 32 side, the apparatus is less likely to be clogged with powder. It is not necessary to provide, replace for cleaning on a regular basis a filter and the like for powder removal in the conveying apparatus.

Further, when joining the separators 30 of the electric device 1, a powder may be applied and then dried to the heat-resistant material 32 of the separator 30 to be bonded.

With this configuration, even when the heat-resistant material 32 is formed in powder and easily scattered, it is possible to effectively prevent the heat-resistant material 32 of the separator 30 from being scattered. Further, since each conveying apparatus does not suck powder, it is not suffered from clogging.

Further, when welding the separators 30 of an electrical device 1, ceramics may be used as the heat-resistant material 32 of the separators 30 to be joined.

With this configuration, in particular, when the heat-resistant material 32 is a porous material molded of inorganic compounds at a high temperature, it is possible to effectively prevent the heat-resistant material 32 of the separator 30 from scattering in the separator welding apparatus 100. Also, since each conveying apparatus does not suck ceramics, thus free from being clogged by the ceramics.

Second Embodiment

Figure 11:
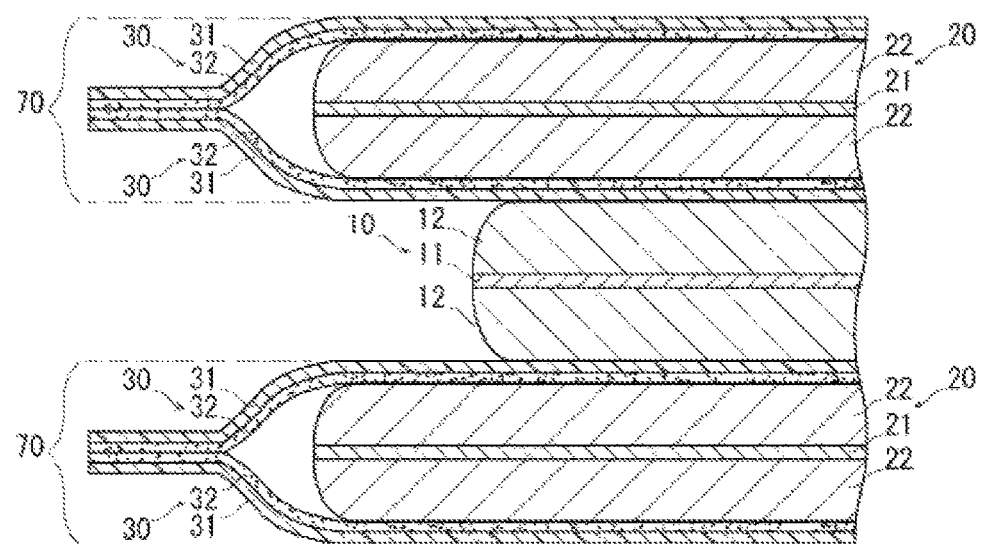
FIG. 11 is a section view of part of an electrical device in a state in which an electrode is pouched by a pair of separators to form a pouched electrode and a positive electrode is laminated respectively on both surfaces of the pouched electrode.

Description is now given of an electrical device pertaining to a second embodiment with reference to FIG. 11.

In the second embodiment, with respect to the similar structure as the first embodiment, the same reference numeral is used and the description thereof is omitted.

FIG. 11 is a section view showing apart of an electrical device in a state in which a positive electrode 10 is laminated respectively on both surfaces of a pouched electrode 70 formed by a negative electrode 20 pouched by a pair of separators 30.

Frictional force is generated between the heat-resistant material 32 of the separator 30 and the negative electrode active material 22 of the negative electrode 20 since they are in contact to each other. Therefore, even when the electrical device vibrates or receives shocks, it is possible to suppress displacement of the negative electrode 20 within the pouched electrode 50 in which the negative electrode 20 is pouched by separators 30. In other words, in the electrical device 1, by suppressing the stack deviation of the negative electrode 20, damage on the electrical device may be prevented, and the electrical property may be secured.

The electrical device pertaining to the second embodiment described above is effective when the friction force generated between the melt material 32 and the negative electrode active material 22 of the negative electrode 20 is greater than the frictional force generated between the heat-resistant material 32 and the positive electrode active material 12.

In addition, the present invention is capable of various modifications on the basis of the configuration described in the claims, which will be included within the scope of the present invention and their equivalents.

In the first embodiment, as an example, description is given of a conveying apparatus in which the separator 30 is conveyed with the side of the melt material 31 of the separator 30 sucked by the conveying apparatuses (vacuum suction conveyance drum 540, suction conveyer 310, and the pouched electrode suction pad 810). However, the configuration is not limited thereto. For example, even when the separator 30 is transported while clamping the side of the melt material 31 of the separator 30, or when the separator 30 is transported with the side of the melt material 31 of the separator mounted by the conveying apparatus, it is possible to seal the heat resistant material 32 within the interior of the adjacent separators 30.

Further, in the embodiment, as an example, description is given of the configuration of bagging or pouched structure in which the positive electrode 10 is pouched by a pair of separators 30. However, the configuration is not limited thereto. For example, it may be configured that a positive electrode 20 may be pouched by a pair of separators 30 by way of the separator welding apparatus 100. This configuration is effective in a case in which the frictional force generated between the heat-resistant material 32 and the negative electrode active material 22 of the negative electrode 20 is greater than the frictional force generated between the heat-resistant material 20 and the positive electrode active material 12 of the positive electrode 10.

The invention claimed is:

1. A welding method for joining separators of an electrical device together by laminating an electrode between two separators, the welding method comprising:
    preparing each separator to include a melt material and a heat-resistant material laminated on only one surface of the melt material and having a melting point higher than a melting point of the melt material;
    conveying the electrode;
    conveying the laminated separators to either side of the electrode while holding the melt material of each separator, wherein the heat-resistant material of each separator contacts opposing sides of the electrode;
    cutting the separators to have a longitudinal length longer than a longitudinal length of the electrode; and
    welding longitudinal ends of the adjacent separators together with the heat resistant materials of the adjacent separators facing each other to form a pouched electrode.

2. The welding method for joining separators of an electrical device as claimed in claim 1, wherein the heat-resistant material of the separator is porous ceramics formed by binding particles of silica, alumina, zirconium oxide, or titanium oxide and a binder.

3. The welding method for joining separators of an electrical device as claimed in claim 1, wherein the electrode is one of a positive electrode and a negative electrode, the method further comprising:
    selecting one of the positive electrode and the negative electrode to form the pouched electrode based on which of the positive electrode and the negative electrode generates a greater friction force with the heat resistant materials.

* * * * *